United States Patent [19]
Davis et al.

[11] 3,851,464
[45] Dec. 3, 1974

[54] GAS TURBINE FUEL CONTROL

[75] Inventors: James L. Davis; Edward L. Lopke, both of Kokomo; Leslie Joseph Pechous, Carmel, all of Ind.

[73] Assignee: General Motors Corporation, Detroit, Mich.

[22] Filed: Aug. 28, 1973

[21] Appl. No.: 392,738

[52] U.S. Cl.......................... 60/39.28 T, 60/39.28 R
[51] Int. Cl. ............................................. F02c 9/10
[58] Field of Search ................. 60/39.28 R, 39.28 T

[56] References Cited
UNITED STATES PATENTS

| | | | |
|---|---|---|---|
| 2,941,359 | 6/1960 | Miller | 60/39.28 T |
| 2,971,338 | 2/1961 | Bodemuller | 60/39.28 T |
| 3,049,881 | 8/1962 | Braunagel | 60/39.28 T |
| 3,098,356 | 7/1963 | Joline | 60/39.28 T |
| 3,123,974 | 3/1964 | Pearson | 60/39.28 R |
| 3,128,946 | 4/1964 | Hoberman | 60/39.28 T |
| 3,520,133 | 7/1970 | Loft | 60/39.28 R |
| 3,546,598 | 12/1970 | McCauley | 60/39.28 R |

Primary Examiner—Clarence R. Gordon
Attorney, Agent, or Firm—Paul Fitzpatrick

[57] ABSTRACT

A fuel control for a gas turbine engine includes electrical circuits to generate a signal which determines the amount of fuel supplied to the engine. The signal responds to an input from the operator of the engine. A limit to fuel flow is required to prevent too high temperature during acceleration of the engine, particularly at low engine speed. A signal indicative of actual turbine inlet temperature of the engine is compared with a variable limit signal which is modified by inputs of ambient atmospheric temperature and engine (gas generator) rotational speed. Precise control of the temperature limit signal is accomplished by a circuit embodying operational amplifiers which respond to ambient temperature and engine speed and an operational amplifier which determines the value of speed at which the temperature limit may rise with speed. The circuit also includes an output operational amplifier (follower) establishing a maximum temperature signal except as reduced by the effect of the other amplifiers.

5 Claims, 2 Drawing Figures

GAS TURBINE FUEL CONTROL

Our invention is directed to controls for gas turbine power plants, and particularly to means for controlling the fuel supply of such an engine during acceleration of the engine so as to maximize acceleration while avoiding damage to the engine or unstable operating conditions. More specifically, our invention is directed to a circuit for establishing a schedule of maximum engine temperature as a function of the temperature of the air entering the engine and of the rate of rotation of the compressor and the turbine which drives it.

The principal object of our invention is to provide a schedule of allowable temperature as a function of atmospheric temperature and engine rotational speed. A further object is to provide a temperature limiting signal of a high degree of accuracy. A further object is to provide such a signal by an electronic circuit responsive to the controlling parameters and effective to deliver a potential signal corresponding to the allowable engine maximum temperature.

The nature of our invention and its advantages will be apparent to those skilled in the art from the succeeding detailed description of the preferred embodiment of the invention and the accompanying drawings.

GENERAL DESCRIPTION OF THE POWER PLANT

Figure 1:
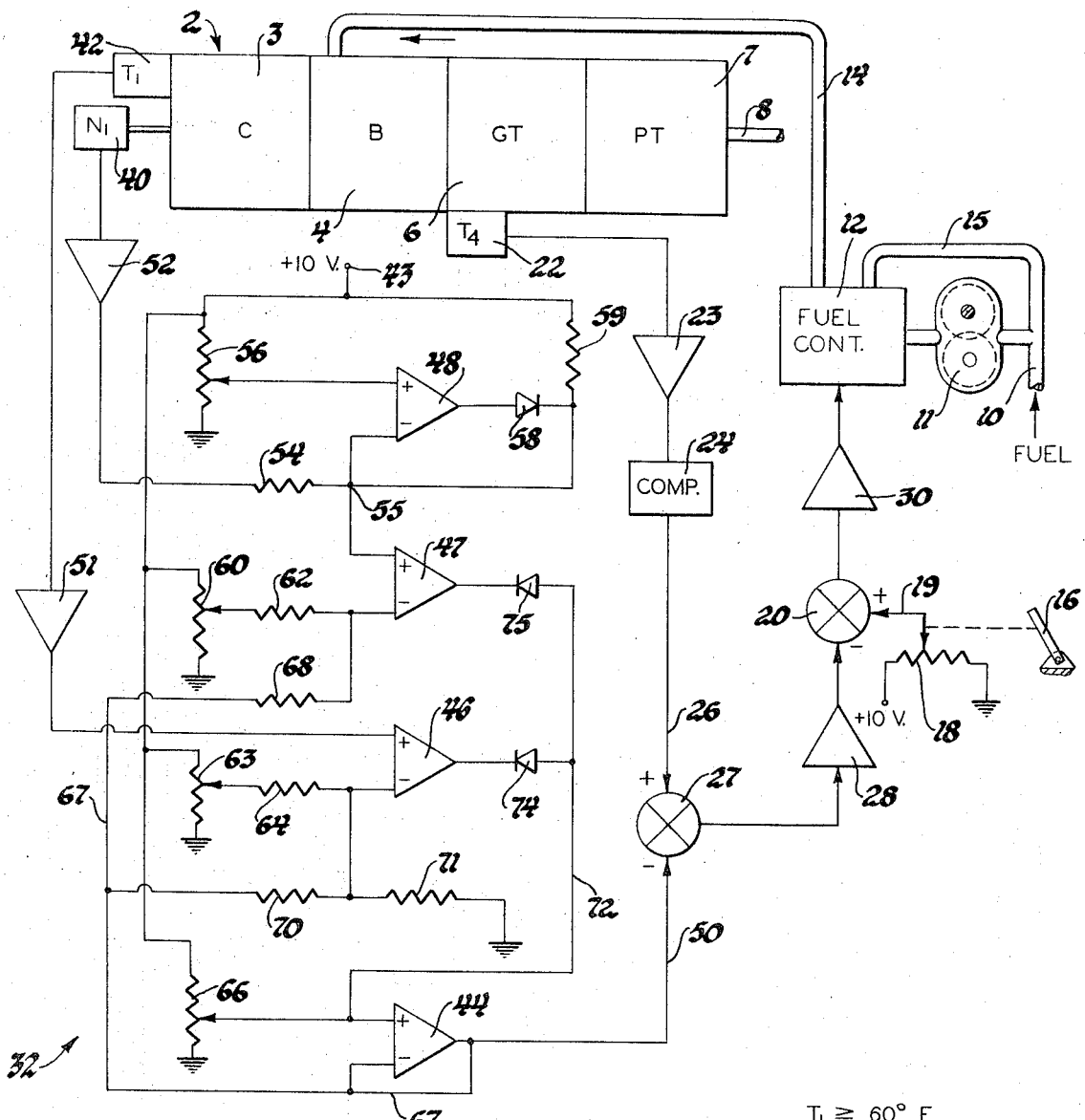
FIG. 1 is a schematic diagram of a gas turbine control system embodying the invention.

The power plant illustrated schematically in FIG. 1 comprises a gas turbine engine 2 of the gas-coupled type including a compressor 3 which draws in atmospheric air and delivers it at higher pressure, a burner or combustion apparatus 4 which receives the discharge from the compressor, and a gas generator turbine 6 which is driven by the combustion products from burner 4, and which is connected to drive the compressor 3. These elements constitute a gas generator which delivers partly expanded combustion products to a power turbine 7 which drives a power output shaft 8. Fuel for the engine is delivered from any suitable source through a low pressure fuel line 10, a pump 11 which may be driven by the gas generator, a fuel control 12, and a fuel line 14 to the burner, where it is ignited by means not illustrated. The fuel control meters the fuel supplied to the engine and returns excess pump discharge to the pump inlet through a by-pass line 15.

The fuel control 12 is of a type which operates to meter fuel in response to the magnitude of an electrical signal. One such device is described in Carothers U.S. Pat. No. 3,732,039, May 8, 1973. The electrical signal, as indicated on the schematic diagram, is generated in part by an operator control such as the accelerator pedal 16 of a vehicle which transmits a potential signal indicative of the desired engine power level, which may be expressed as the turbine inlet temperature. The pedal 16 operates some position transducer which provides a potential signal indicative of the requested temperature or power level. As illustrated in FIG. 1, this is accomplished by a connection from the accelerator pedal to the movable tap of a potentiometer 18 connected between a closely regulated +10 volt supply and ground. The position of the potentiometer tap determines the potential supplied through a lead 19 to an algebraic summing device 20. The signal indicative of desired engine temperature is a positive input and a signal representative of actual engine temperature is a negative input to device 20. This temperature signal originates with one or more thermocouples or other temperature measuring devices 22, the symbol $T_4$ indicating gas generator turbine inlet temperature.

The details of thermocouple circuits as such are immaterial to our present invention. In a general way, it may be pointed out that the thermocouples 22 are connected through an amplifier 23 and a compensating circuit 24 to a compensated temperature lead 26, the potential on which represents the value of turbine inlet temperature which provides a feedback to the summing device 20. The specific thermocouple and amplifier circuits which are preferred for use with the present invention are disclosed in our U.S. patent application Ser. No. 381,055 filed July 20, 1973 for Thermocouple Amplifier and the compensating circuit 24 is preferably that described in our U.S. patent application Ser. No. 392,739 filed Aug. 29, 1973 for Gas Turbine Fuel Control, both of common ownership with this application. The compensated temperature signal on line 26 is fed through an algebraic summing device 27 and amplifier 28 to the subtractive input of summing device 20. The output, which is positive only as long as the temperature request signal on line 19 is higher than the temperature output signal of amplifier 28, is fed through an amplifier 30 to the fuel control.

TEMPERATURE LIMIT SIGNAL GENERATING CIRCUIT

As will be appreciated, the circuit as so far described provides insufficient control of turbine inlet temperature in case the accelerator pedal is moved to call for maximum acceleration of the engine. It requires also means to prevent drastic overshoots of turbine inlet temperature, particularly at low speeds and low ambient temperatures. This is accomplished by providing a limit signal for turbine inlet temperature according to a schedule which is based upon the characteristics of the engine. The limit signal reacts with the inputs from the operator control and turbine inlet temperature sensor to limit the fuel supplied to the safe amount. The limit signal is generated by a circuit indicated generally by the numeral 32, which comprises substantially all of the system not so far described.

Figure 2:
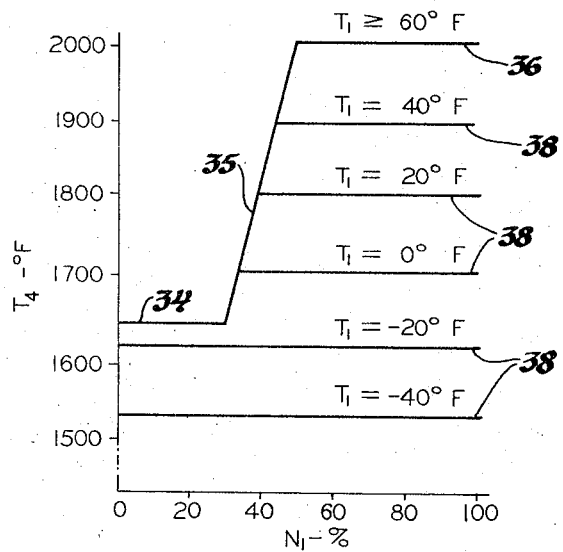
FIG. 2 is a graph illustrating the nature of the output of the temperature limiting control as a function of the inputs.

Before describing the limit signal generating circuit, we may refer to FIG. 2 for an understanding of the nature of the output of this circuit. FIG. 2 is a plot of allowable turbine inlet temperature in degrees Fahrenheit as against gas generator speed in percent of maximum rated speed. The line composed of segments 34, 35, and 36 represents the maximum allowable turbine temperature over the speed range of the gas generator when ambient temperature is at or above 60°F. The level segment 34 extends from 0 to 30 percent of rated gas generator speed. The rising line 35 carries to 50 percent speed, which may be regarded as normal idling speed, and line segment 36 which is at 2,000°F. represents the maximum allowable turbine inlet temperature under any circumstances. If the engine is started with temperature above 60°F., the limiting signal will be at 1,650°F. up to 30 percent speed, then rise linearly to 2,000° at 50 percent engine speed, remaining thereafter at that figure.

When the ambient temperature decreases below 60°F., it is necessary to lower the temperature limit to avoid possible compressor surge. The set of parallel lines 38 indicate maximum scheduled turbine inlet temperature for various ambient temperatures down to −40°F. As ambient temperature decreases, the turbine temperature limit likewise decreases, to prevent surge of the compressor. For example, if the ambient temperature is 0°F., the engine would start on line 34 and continue up to 30 percent speed and then rise along line 35 until it encounters the 0°F. line 38 at about 1,720°F. and continue to be limited at that temperature. If the ambient temperature drops below about −15°F., the limit of temperature is constant as, for example, on the −20°F. line where the turbine temperature limit is about 1,620°F.

It will be seen that the line 36 represents the upper allowable limit of turbine inlet temperature, the lines 38 represent the gradual lowering of allowable turbine inlet temperature with ambient temperature, and the lines 34 and 35 represent a limit to temperature, below what might otherwise be scheduled, at low turbine speeds up to idle. With this in mind, we may proceed to the description of the limit signal generating circuit 32.

Referring again to FIG. 1, the gas generator turbine 6 drives a speed transducer 40 which transmits a potential signal representing a gas generator rpm. An ambient temperature transducer 42 is arranged near the inlet to the compressor so that it responds to the temperature of air entering the compressor, which is ordinarily substantially the same as ambient atmospheric temperature. These two transducers provide the senses of ambient temperature and speed required to establish the $T_4$ limit signal.

To provide the most complete and facilitating disclosure of our preferred circuit, the types or values of components are given in the description, but it is to be understood that these are to some extent a matter of choice and may be varied to suit different requirements or in response to changes in available equipment.

The limit signal generating circuit is supplied with power from a closely regulated 10 volt supply as indicated at 43. The circuit comprises four operational amplifiers 44, 46, 47, and 48. In practice, as a matter of assembly, these may be two double operational amplifiers of type S5558V made by Signetics Corporation.

The output terminal of amplifier 44 is connected to the temperature limit signal line 50 which is connected subtractively to the summing device 27 previously referred to, where this signal is subtracted from that of corrected temperature on line 26 to provide a positive signal to the amplifier 28 if temperature is above that called for by the circuit 32.

The temperature transducer 42 is connected through an amplifier 51 to the non-inverting input terminal of operational amplifier 46. The speed transducer 40 is connected through an amplifier 52 and a resistor 54 (10 kilohms) by way of a junction 55 to the non-inverting input terminal of operational amplifier 47. Junction 55 is also connected to the inverting input terminal of operational amplifier 48. The non-inverting input terminal of operational amplifier 48 is energized from the 10 volt supply through a variably settable potentiometer 56 (20 kilohm). The output terminal of amplifier 48 is connected through a diode 58 to junction 55. Junction 55 is also connected to the 10 volt supply through a resistor 59 (10 kilohm).

The inverting input terminal of speed amplifier 47 is energized from the 10 volt supply through a potentiometer 60 (1 kilohm) and a resistor 62 (47 kilohm). The inverting input terminal of ambient temperature amplifier 46 is connected to the 10 volt supply through a potentiometer 63 (5 kilohm) and a resistor 64 (180 kilohm). The non-inverting input terminal of output amplifier 44 is connected to the 10 volt supply by potentiometer 66 (20 kilohm). The output terminal of amplifier 44 is connected to its inverting input terminal by a line 67 which is also connected through a resistor 68 (18 kilohm) to the inverting input terminal of speed amplifier 47. Lead 67 is also connected to the inverting input terminal of temperature amplifier 46 by a resistor 70 (18 kilohm) and this input is also grounded through a resistor 71 (43 kilohm).

The non-inverting input of output amplifier 44 is connected through lead 72 and diodes 74 and 75 to the output terminals of amplifiers 46 and 47 respectively. The diodes 58, 74, and 75 are Delco Service type 31.

As is well known, an operational amplifier such as those shown is a device having high input impedance, low output impedance, and high gain. It has a differential input such that, when the non-inverting input potential is higher than that of the inverting input, the output is turned on; and, when the inverting input potential is higher than that of the non-inverting input, the amplifier turns off. Thus, with feedback from the output to the inverting input, the output will follow the input to the non-inverting input terminal.

Thus, operational amplifier 44 which feeds the signal line 50, and has a direct connection through branch line 67 to the inverting input, acts as a potential follower and delivers the same potential on line 50 as is impressed on the non-inverting input. The potential derived from potentiometer 66 determines the level of the output signal in the absence of any other influence. This is the maximum turbine inlet temperature signal represented by line 36 in FIG. 2.

Since the temperature and speed operational amplifiers 46 and 47 have their outputs connected through diodes as illustrated to the input of the amplifier 44, they may not increase the potential on the non-inverting input of amplifier 44 but may reduce it and thereby reduce the temperature limit signal on line 50. Temperature amplifier 46 receives a feedback of the signal on line 50 through line 67 and the voltage divider defined by potentiometer 63 and resistors 64, 70, and 71 to its inverting input. The potentiometer is a calibrating device. The temperature signal from amplifier 51 is fed to the non-inverting input. Thus, the output potential of 46 is high when the ambient temperature signal exceeds the feedback signal and low when the feedback is greater than the ambient temperature signal. When output is low, current flows from line 72 through diode 74 and thus decreases the voltage at the top of potentiometer 66 and correspondingly reduces the output potential on line 50 until the feedback on the negative input terminal of operational amplifier 46 balances the ambient temperature input. The relative values of resistors 70 and 71 determine the degree of lowering of potential on the output line 50 for a given lowering of ambient temperature.

The speed amplifier 47 receives an input of the speed signal potential from amplifier 52 through resistor 54 and junction 55. The inverting input receives a potential which varies linearly with that on lines 50 and 67. The proportion is determined by resistors 62 and 68 which thus determine the slope of the line segment 35 of FIG. 2. Potentiometer 60 provides an adjustment for calibration. When ambient temperature is above 60°F. and engine speed is below 50 percent, the non-inverting input is less than the inverting input, which is limited by potentiometer 66. The potential on the output of amplifier 47 is therefore reduced to draw current through potentiometer 66 until the feedback signal through line 67 balances the input from junction 55. This causes the output to follow line 35 of FIG. 2.

The operational amplifier 48 provides a lower limit to the reduction of the temperature signal in response to engine speed to cause the control to follow the line 34 unless ambient temperature is so low that turbine temperature may not reach the 1,650°F. figure. The potential fed to the non-inverting input of amplifier 47 is also supplied to the inverting input of amplifier 48. When this tries to drop below the potential tapped by potentiometer 56, amplifier 48 turns on and supplies potential through diode 58 to the non-inverting input of amplifier 47. Thus, amplifier 48 overrides the speed signal to provide a bottom limit to the reduction of the temperature signal on line 50 in response to lowered speed. When the speed signal is above that set on potentiometer 56, there is no effect on amplifier 47 because the diode 58 blocks flow from junction 55 to amplifier 48.

It should be apparent from the foregoing that our system provides a very accurate means for providing the desired temperature control indicated by FIG. 2. The use of the operational amplifiers provides very adequate control and sharp intersections between line segments such as 34, 35, 36, or 34, 35, and 38. Thus, the temperature can be limited exactly to the maximum safe value by cooperation of this temperature limit signaling device with a suitable temperature measuring device which responds to actual engine temperature.

We have illustrated the control input 16 as controlling engine temperature, with a temperature feedback. It could, of course, directly control gas generator speed against a speed feedback. In this case, the temperature control system disclosed herein could serve as an override or limiter on the fuel control.

The detailed description of the preferred embodiment of the invention for the purpose of explaining the principles thereof is not to be considered as limiting or restricting the invention, since many modifications may be made by the exercise of skill in the art.

We claim:

1. A system for establishing a schedule of turbine temperature for a gas turbine engine as a function of ambient temperature and turbine speed comprising, in combination, a first operational amplifier effective to provide a temperature limit signal; a second operational amplifier responsive to ambient temperature having its output connected to an input of the first operational amplifier so as to lower the limit signal progressively with decrease in ambient temperature; a third operational amplifier responsive to turbine speed having its output connected to the said input of the first operational amplifier so as to lower the limit signal progressively with decrease in turbine speed; the second and third operational amplifiers being connected to the first operational amplifier so that the output calling for the lower limit signal prevails; and means connected to the third operational amplifier effective to provide a lower speed limit to the turbine speed responsive input of the third operational amplifier.

2. A system for establishing a schedule of turbine temperature for a gas turbine engine as a function of ambient temperature and turbine speed comprising, in combination, a first operational amplifier effective to provide a temperature limit signal and to define an upper limit to the limit signal; a second operational amplifier responsive to ambient temperature having its output connected to an input of the first operational amplifier so as to lower the limit signal progressively with decrease in ambient temperature; a third operational amplifier responsive to turbine speed having its output connected to the said input of the first operational amplifier so as to lower the limit signal progressively with decrease in turbine speed; the second and third operational amplifiers being connected to the first operational amplifier so that the output calling for the lower limit signal prevails; and a fourth operational amplifier connected to the third operational amplifier so as to provide a lower speed limit to the turbine speed responsive input of the third operational amplifier.

3. A system for establishing a schedule of turbine temperature for a gas turbine engine as a function of ambient temperature and turbine speed comprising, in combination, an output operational amplifier, means to supply a potential representing an upper turbine temperature limit to the noninverting input terminal of the output operational amplifier, a temperature limit signal output line connected to the output terminal and the inverting input terminal of the output operational amplifier; an ambient temperature operational amplifier, means to supply a potential representing ambient temperature to the non-inverting input terminal of the ambient temperature operational amplifier, a turbine speed operational amplifier, means to supply a potential representing turbine speed to the non-inverting input terminal of the turbine speed operational amplifier; means to supply potentials proportional to the potential on the temperature limit signal line to the inverting input terminals of the ambient temperature and turbine speed operational amplifiers; and unidirectional conducting means connecting the noninverting input terminal of the output operational amplifier to the respective output terminals of the ambient temperature and turbine speed operational amplifiers.

4. A system for establishing a schedule of turbine temperature for a gas turbine engine as a function of ambient temperature and turbine speed comprising, in combination, an output operational amplifier, means to supply a potential representing an upper turbine temperature limit to the noninverting input terminal of the output operational amplifier, a temperature limit signal output line connected to the output terminal and the inverting input terminal of the output operational amplifier; an ambient temperature operational amplifier, means to supply a potential representing ambient temperature to the non-inverting input terminal of the ambient temperature operational amplifier; a turbine speed operational amplifier, means to supply a potential representing turbine speed to the non-inverting input terminal of the turbine speed operational amplifier; means to supply potentials proportional to the potential on the temperature limit signal line to the inverting input terminals of the ambient temperature and turbine speed operational amplifiers; unidirectional conducting means connecting the non-inverting input terminal of the output operational amplifier to the respective output terminals of the ambient temperature and turbine speed operational amplifiers; a lower limit operational amplifier, means to supply a fixed potential to the non-inverting input terminal of the lower limit operational amplifier, means connecting the inverting input terminal of the lower limit operational amplifier to the non-inverting input terminal of the turbine speed operational amplifier, and unidirectional conducting means connecting the output terminal of the lower limit operational amplifier to the non-inverting input terminal of the turbine speed operational amplifier.

5. A system for controlling fuel flow to a gas turbine engine as a function of ambient temperature, turbine speed, and turbine temperature comprising, in combination, a first operational amplifier effective to provide a temperature limit signal; a second operational amplifier responsive to ambient temperature having its output connected to an input of the first operational amplifier so as to lower the limit signal progressively with decrease in ambient temperature; a third operational amplifier responsive to turbine speed having its output connected to the said input of the first operational amplifier so as to lower the limit signal progressively with decrease in turbine speed; the second and third operational amplifiers being connected to the first operational amplifier so that the output calling for the lower limit signal prevails; means connected to the third operational amplifier effective to provide a lower speed limit to the turbine speed responsive input of the third operational amplifier; means providing a signal of turbine temperature; and means responsive to the turbine temperature and temperature limit signals effective to control engine fuel flow.

* * * * *